July 25, 1944.                H. W. CRAIG                    2,354,438
                       MOUNTING FOR FUEL TANKS
                Filed Nov. 27, 1941            2 Sheets-Sheet 1

Inventor
HENRY W. CRAIG
By
Attorneys

July 25, 1944.  H. W. CRAIG  2,354,438
MOUNTING FOR FUEL TANKS
Filed Nov. 27, 1941  2 Sheets-Sheet 2
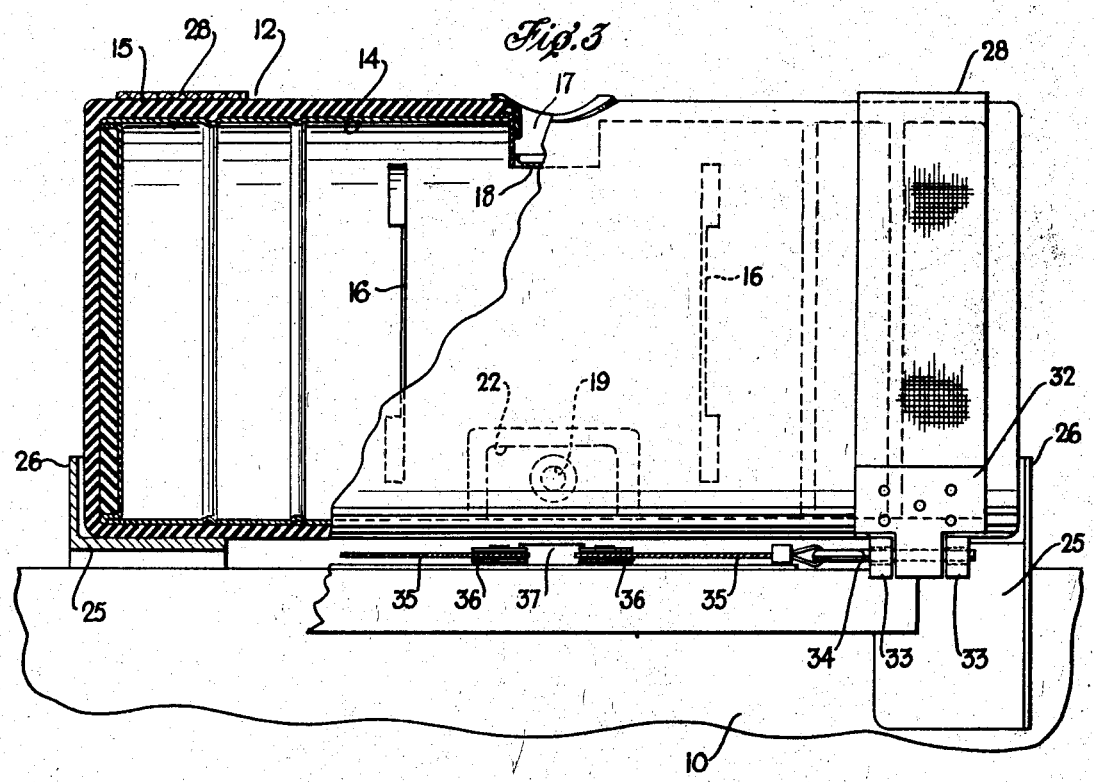
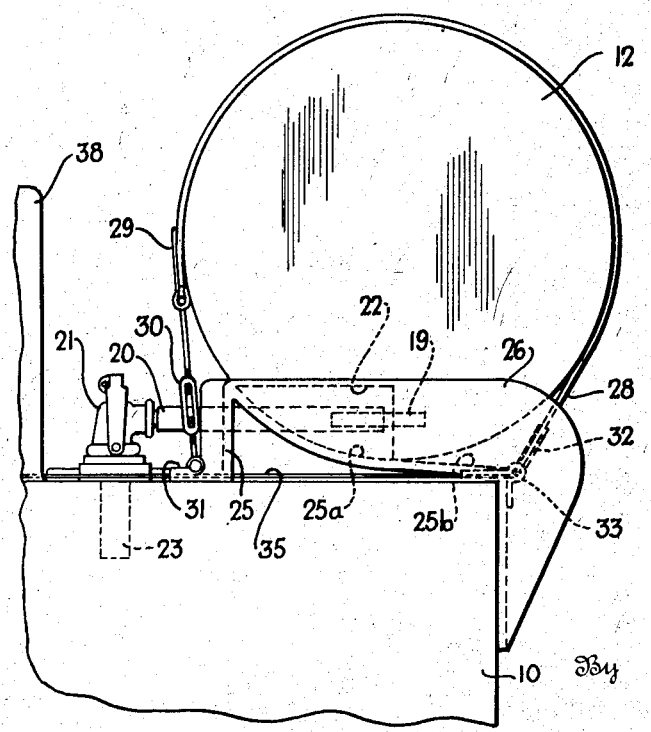
Inventor
HENRY W. CRAIG Patented July 25, 1944

2,354,438

UNITED STATES PATENT OFFICE 2,354,438

MOUNTING FOR FUEL TANKS

Henry W. Craig, Akron, Ohio, assignor to The Firestone Tire & Rubber Company, Akron, Ohio, a corporation of Ohio Application November 27, 1941, Serial No. 420,699

4 Claims. (Cl. 280—5)

This invention relates to mounting for fuel tanks, and more especially it relates to fuel tank mountings for motor driven vehicles adapted readily to enable the jettisoning of the tanks when desired.

The invention is of especial utility in its application to the armed and armored military vehicles known as "tanks." In actual combat, such vehicles are used in the van of the offensive forces to effect a "break through," and to hold the occupied terrain until they can be supported by infantry troops. The vehicles usually are propelled by liquid fuel, and under the conditions noted their supply of fuel cannot be replenished until the supply columns following the infantry have arrived. Thus it is important that the vehicles have an ample supply of fuel to carry out the tactical maneuver planned, otherwise they may become immobilized with possible serious results. Obviously the fuel tanks of the vehicles must be protected from gun fire, and for this reason they are mounted interiorly of the vehicles where they are protected by the armor thereof. The size of the tanks, however, is necessarily limited by the need for space within the vehicle for ammunition and other necessary supplies, and for the crew that operates the vehicle and its various weapons.

To extend the range of operation of vehicles of the character mentioned, it has been proposed to equip the vehicles with auxiliary fuel tanks that are mounted upon the exterior of the vehicles, and which may be jettisoned whenever the vehicles enter combat areas, the jettisoned tanks subsequently being salvaged when possible. The arrangement enables the vehicles to enter combat with their main fuel tanks full, and thereby to continue mobile operation for a longer interval than otherwise would be possible. Jettisoning of the auxiliary tanks is effected by the crew of the vehicle from the interior thereof, and it is to improved means for mounting the auxiliary tanks and for effecting the release thereof that this invention primarily is directed.

The chief objects of the invention are to provide a simple and efficient mounting for supporting a fuel tank upon the body of a vehicle; to provide a mounting of the character mentioned that will cause the fuel tank to fall to the ground upon release of simple tank-retaining means; and to provide improved means manually operable from the interior of the vehicle for releasing the tank-retaining means. Other objects will be manifest as the description proceeds.

Of the accompanying drawings:

Figure 3 is a side elevation of one of the fuel tanks and its supporting structure, a part thereof being broken away and in section; and Figure 4 is an end elevation of the structure shown in Figure 3, as viewed from the right thereof.

Figure 1:
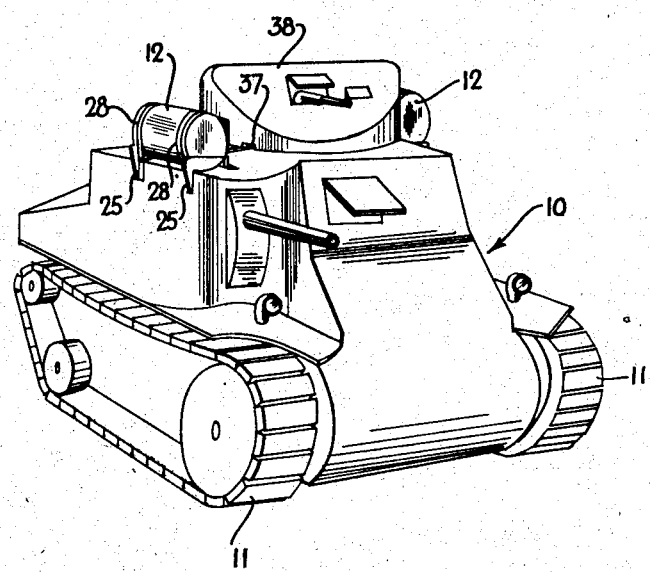
Figure 1 is a perspective view of an armored motor vehicle equipped with auxiliary fuel tanks on its external structure, and tank-mounting means embodying the invention supporting the tanks on the vehicle.
Figure 2:
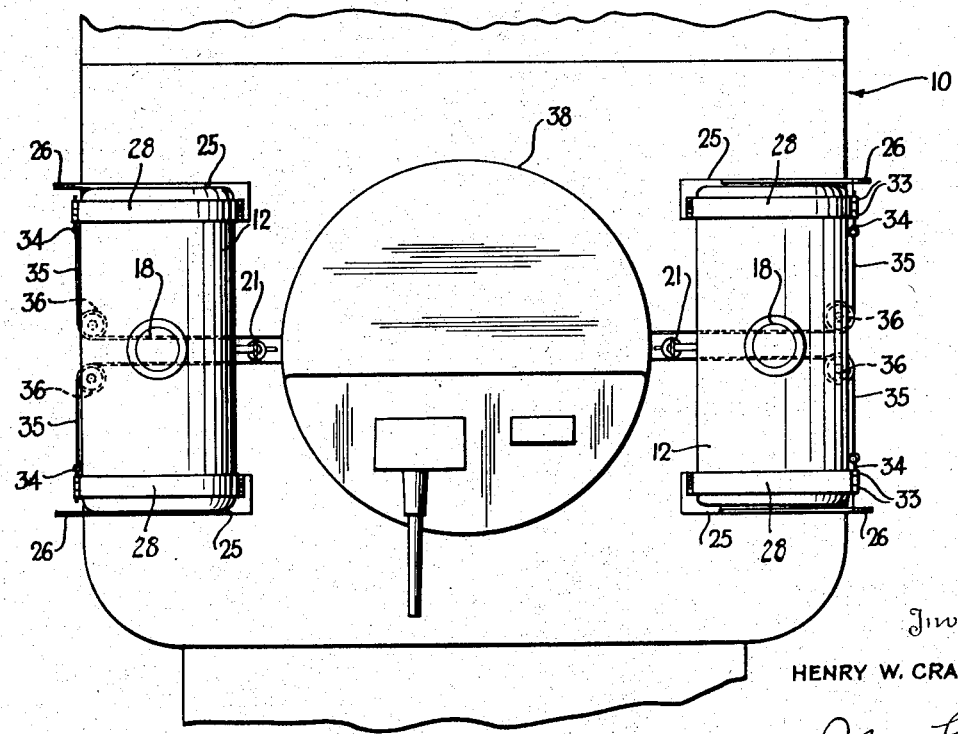
Figure 2 is a fragmentary plan view, on a larger scale, of the vehicle shown in Fig. 1, including the fuel tanks and their supports.

Referring to Figure 1 of the drawings there is shown a conventional armed and armored combat vehicle 10 of the general type known as a "tank." The vehicle is propelled by the usual endless articulated tracks 11, 11 that are driven by a suitable gasoline or oil driven motor (not shown) within the vehicle, the main reservoir of liquid fuel for the motor also being located interiorly of the vehicle to protect it from gunfire. In addition to its main fuel reservoir, the vehicle is provided with auxiliary fuel tanks 12, 12 that are mounted upon the superstructure of the vehicle, at the sides thereof, in position to fall clear of the vehicle upon operation of releasable means that attach them to the vehicle.

Each tank 12 is of cylindrical shape, and comprises a metal lining 14, Fig. 3, and an external cover or casing 15 that preferably is of resilient material to cushion the impact of the tank when it strikes the ground upon being jettisoned. If desired, the tank-cover 15 may be of bullet-sealing composition, although it is intended that the tank be jettisoned before the vehicle enters an area where it is exposed to gunfire. Within each tank are the usual baffle plates 16. The tanks are mounted upon the vehicle in horizontal position, and in that side of each tank that is uppermost when so mounted there is an opening 17 by means of which the tank is filled with fuel, said opening being provided with a suitable cap or bung 18. The tank outlet is located at the diametrically opposite side thereof from the opening 17, which is the lowest region of the tank when the same is mounted on the vehicle. Said outlet comprises a short tubular metal pipe 19 that extends through the wall of the tank, and a flexible hose 20, preferably of bullet sealing material, that connects the pipe 19 to a valve 21. The pipe 19 is disposed within a re-entrant region 22 in the tank, the arrangement being such that the pipe has protection from contact with the ground whenever the tank is jettisoned. The valve 21 is mounted upon the outwardly projecting end of a feed pipe 23 that extends to the main fuel reservoir within the vehicle. The hose 20 is lightly connected to the valve 21, and readily pulls away from the latter when the tank 12 is jettisoned. The valve 21 is of special construction, being arranged automatically to close whenever the hose 20 is disconnected therefrom. The hose 20 also includes a valve structure (not shown) that closes when the hose is disconnected from the valve 21 and thereby prevents loss of fuel from the tank. Since the specific construction of said valves is not a part of the present invention, it is believed that a more comprehensive showing thereof will not be necessary.

For mounting each of the tanks 12 upon the vehicle a pair of ramps 25, 25 is provided, which ramps are suitably secured to the superstructure of the vehicle, at the edge of a horizontal surface thereof. As is best shown in Fig. 4, each ramp comprises an arcuate surface 25a that has a radius of the same length as the radius of the external surface of the tank 12, and a straight surface 25b in extension of said arcuate surface, said straight surface being downwardly inclined with relation to the horizontal surface of the vehicle structure upon which the ramp is mounted, the terminus of said flat portion of the ramp being at the edge of said horizontal surface of the vehicle. Each pair of ramps 25 is so positioned as to receive the opposite end portions of a tank 12 thereon, each ramp having an upstanding lateral flange 26 on one side thereof, which flange is disposed beside an endwall of the tank and prevents axial movement of the latter.

A tank 12 rests upon ramps 25 with its arcuate peripheral surface flush upon the arcuate surfaces 25a of the ramps, and is held in this position by a pair of flexible girths 28, 28 which may be composed of textile material such as cotton webbing. One end of each girth 28 is provided with a metal loop 29, Fig. 4, that is pivotally connected to one end of a turn-buckle 30, the other end of the latter being pivotally connected to a bracket 31 that is mounted upon a ramp structure 25, at the end thereof remote from the edge of the horizontal surface on which the ramp is mounted. At its other end each girth is provided with a metal loop 32 that is receivable between a pair of apertured ears 33, 33 formed on the ramp structure 25 at the lower end of the inclined surface 25b thereof, and a pin 34 is inserted through the apertures in said ears and through the loop 32 for releasably anchoring the front end of the girth. By means of the turn-buckles 30 the girth straps 28 may be drawn tightly about the tank 12 to hold the same securely upon the ramps 25.

To jettison a tank 12 requires only the withdrawal of the two pins 34 that connect the girths 28 to the ears 33 of the ramps 25. To this end the confronting ends of the pins 34 are formed with respective loops or eyes to which are connected respective cables 35, the latter being trained about respective sheaves 36 that are mounted upon the vehicle structure below the tank 12 and between the ramps 25. From the sheaves 36 the cables 35 extend to the interior of the vehicle, entering the same through suitable apertures, such as the slot 37, formed at the base of a cupola 38 on the vehicle. Thus the cables are accessible to the crew of the vehicle within the protective armor thereof. The arrangement is such that when a pair of cables 35 are pulled, the pins 34 connected thereto are withdrawn from the ears 33 and the metal loops 32, thus releasing the outer ends of the girth bands 28. This enables the tank 12 to roll by gravity down the inclined ramps 25 and drop from the vehicle, the valved connections previously described preventing loss of fuel.

The invention is simple in construction and operation, and achieves the several advantages set out in the foregoing statement of objects.

Modification may be resorted to without departing from the spirit of the invention, or the scope thereof as defined by the appended claims.

What is claimed is:

1. A fuel tank mounting of the character described comprising a downwardly sloped ramp upon which a fuel tank is positionable, a flexible girth extending partly about the tank and having its ends anchored to the ramp at opposite ends of the latter, means at one end of the girth for tightening it about the tank, quickly releasable means at the other end of the girth for disengaging its connection with the ramp, and means extending to a point relatively remote from the tank for operating said quickly releasable means.

2. A fuel tank mounting of the character described comprising a downwardly sloped ramp upon which a fuel tank is positionable, a flexible girth extending partly about the tank and having its ends anchored to the ramp to retain the tank thereon, a turn-buckle at one end of the girth for tightening the same, the girth anchoring means at the other end of the girth comprising a locking pin, and means connected to said pin and extending to a point relatively remote from the tank to enable manual withdrawal of the pin to effect release of the tank.

3. A fuel tank mounting of the character described comprising a pair of parallel downwardly sloped ramps upon which a cylindrical tank is positionable on a horizontal axis, a lateral flange on each ramp adapted to limit endwise movement of the tank, a pair of girths embracing the tank to retain it upon the ramps, quickly releasable means for disengaging both girths from the tank, and means for concurrently operating said quickly releasable means from a point relatively remote from the tank.

4. A fuel tank mounting of the character described comprising a downwardly sloped ramp upon which a fuel tank is positionable, a flexible girth extending partly about the tank with its ends anchored to secure said tank upon said ramp, means at one end of the girth for tightening it about the tank, quickly releasable means at the other end of the girth for disengaging its connection with the ramp, and means extending to a point relatively remote from the tank for operating said quickly releasable means.

HENRY W. CRAIG.